(12) United States Patent
Maezawa

(10) Patent No.: US 12,722,403 B2
(45) Date of Patent: Sep. 1, 2026

(54) INKJET IMAGE FORMING APPARATUS

(71) Applicant: KYOCERA Document Solutions Inc., Osaka (JP)

(72) Inventor: Nobuhiro Maezawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 132 days.

(21) Appl. No.: 18/968,186

(22) Filed: Dec. 4, 2024

(65) Prior Publication Data

US 2025/0178362 A1 Jun. 5, 2025

(30) Foreign Application Priority Data

Dec. 5, 2023 (JP) ................................ 2023-205253

(51) Int. Cl.

*B41M 5/00* (2006.01)
*B41J 3/407* (2006.01)
*B41J 11/00* (2006.01)
*B41J 29/393* (2006.01)
*C09D 11/101* (2014.01)
*C09D 11/50* (2014.01)
*C09D 11/54* (2014.01)

(52) U.S. Cl.

CPC ........... *B41J 11/0015* (2013.01); *B41J 3/407* (2013.01); *B41J 11/0095* (2013.01); *C09D 11/101* (2013.01); *C09D 11/50* (2013.01); *C09D 11/54* (2013.01)

(58) Field of Classification Search

CPC ................ B41J 11/0015; B41J 11/0021; B41J 11/00212; B41J 11/00214; B41J 11/46; B41J 3/407; B41J 2/2114; B41J 2/2117; B41J 29/393; B41M 5/0011; B41M 5/0017; B41M 3/144

See application file for complete search history.

(56) References Cited

U.S. PATENT DOCUMENTS 10,265,972 B2 * 4/2019 Hojo .................... B41J 11/0015
2019/0023042 A1 * 1/2019 Inaba ..................... B41J 2/2117
2022/0253655 A1 * 8/2022 Abe ....................... B41J 2/2054

FOREIGN PATENT DOCUMENTS

JP 2005-053088 A 3/2005

* cited by examiner

*Primary Examiner* — Scott A Richmond
(74) *Attorney, Agent, or Firm* — Studebaker Brackett PLLC

(57) ABSTRACT

An inkjet image forming apparatus includes an image forming part, a precoating unit, a fluorescent coating surface, a UV lighting device, and a camera. The image forming part forms an image on the printing base material. The precoating unit ejects a precoating liquid having a property of absorbing UV light. On the fluorescent coating surface, the printing base material is conveyed. The UV lighting device irradiates the printing base material conveyed on the fluorescent coating surface with UV light. The camera photographs the printing base material irradiated with the UV light. A position adjustment mark is formed on the printing base material by using the precoating liquid, the formed position adjustment mark is irradiated with the UV light by the UV lighting device, the irradiated position adjustment mark is photographed by the camera, and the image forming part forms an image based on the photographed position adjustment mark.

4 Claims, 4 Drawing Sheets

INKJET IMAGE FORMING APPARATUS

INCORPORATION BY REFERENCE

This application is based on and claims the benefit of priority from Japanese patent application No. 2023-205253 Dec. 5, 2023, which is incorporated by reference in its entirety.

BACKGROUND

The present disclosure relates to an inkjet image forming apparatus which forms an image on a printing base material by an inkjet method.

In the inkjet type image forming apparatus, in order to enhance an adhesion of ink to a printing base material, a precoating may be applied to the printing base material. Further, in such an image forming apparatus, a position adjustment mark printed on a surface of the printing base material is read by an optical sensor, and based on the read position adjustment mark, an image forming position is adjusted or a registration at the time of color printing is performed.

However, when the position adjustment mark is printed on the printing base material in advance, if the printing base material has a certain degree of stretchability, such as a plastic film, the printing base material may be stretched during conveying, and the position of the position adjustment mark may be shifted. As a result, there is a problem that the image forming position is shifted or color mixing occurs at the time of color printing.

SUMMARY

An inkjet image forming apparatus according to the present disclosure includes an image forming part, a precoating unit, a fluorescent coating surface, a UV lighting device, and a camera. The image forming part ejects ink on a printing base material conveyed in a predetermined conveyance direction to form an image. The precoating unit is arranged on an upstream side of the image forming part in the conveyance direction, and ejects a precoating liquid having a property of absorbing UV light. The fluorescent coating surface is arranged between the image forming part and the precoating unit, and on the fluorescent coating surface, the printing base material is conveyed. The UV lighting device irradiates the printing base material conveyed on the fluorescent coating surface with UV light. The camera photographs the printing bae material irradiated with the UV light. A position adjustment mark is formed on the printing base material by using the precoating liquid in the precoating unit, the formed position adjustment mark is irradiated with the UV light by the UV lighting device, the irradiated position adjustment mark is photographed by the camera, and the image forming part forms an image based on the photographed position adjustment mark.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the drawings, an inkjet image forming apparatus according to one embodiment of the present disclosure will be described.

Figure 1:
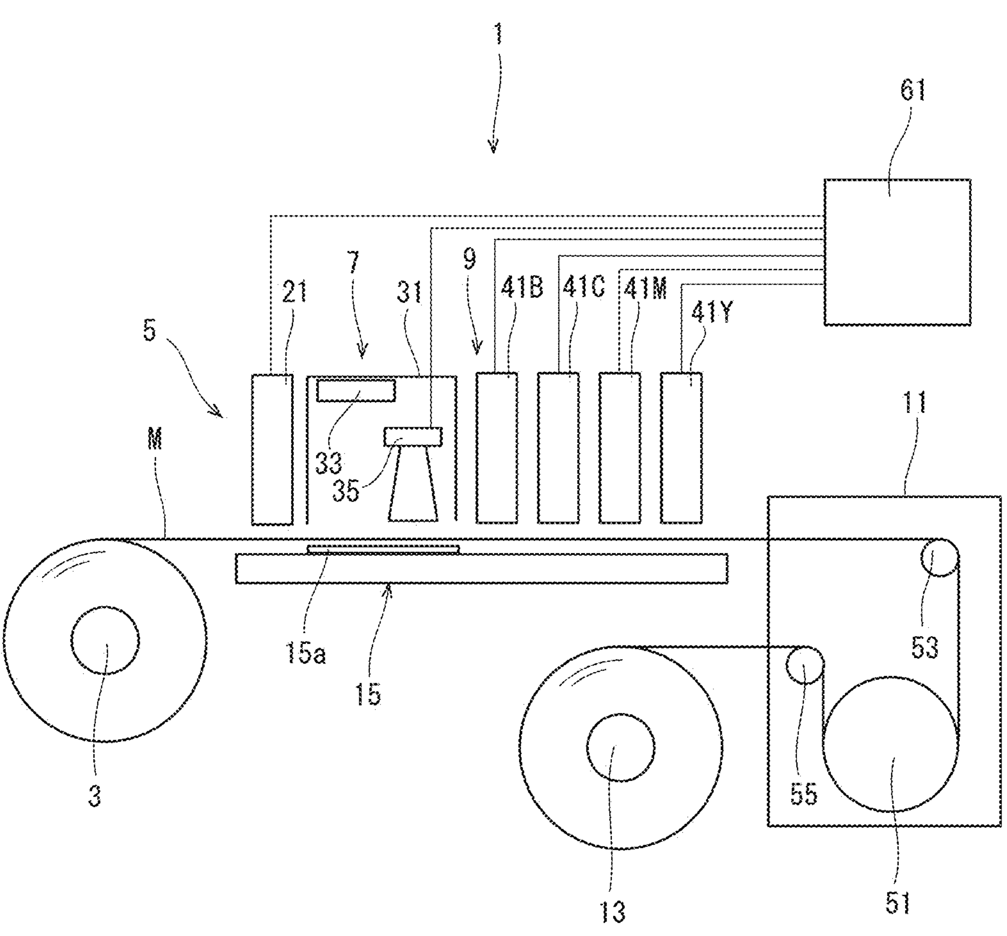
FIG. 1 is a front view schematically showing an inkjet image forming apparatus according to one embodiment of the present disclosure.

With reference to FIG. 1, an entire configuration of the inkjet image forming apparatus 1 will be described. FIG. 1 is a front view schematically showing an internal configuration of the inkjet image forming apparatus 1.

The inkjet image forming apparatus 1 includes a feed roller 3, a precoating unit 5, a photographing part 7, an image forming part 9, a drying part 11, and a rewinding roller 13 in order along a conveyance direction of a printing base material M. The inkjet image forming apparatus 1 further includes a conveying plate 15 disposed below the precoating unit 5, the photographing part 7, and the image forming part 9 between the feed roller 3 and the drying part 11.

First, the feed roller 3 will be described. The long printing base material M is wound around the feed roller 3. When the feed roller 3 is rotated, the printing base material M is fed out in the conveyance direction X.

Next, the precoating unit 5 will be described. The precoating unit 5 applies a precoating to the printing base material M fed from the feed roller 3. The precoating unit 5 includes a precoating head unit 21 which ejects a precoating liquid. The precoating head unit 21 is electrically connected to a control part 61.

Figure 2:
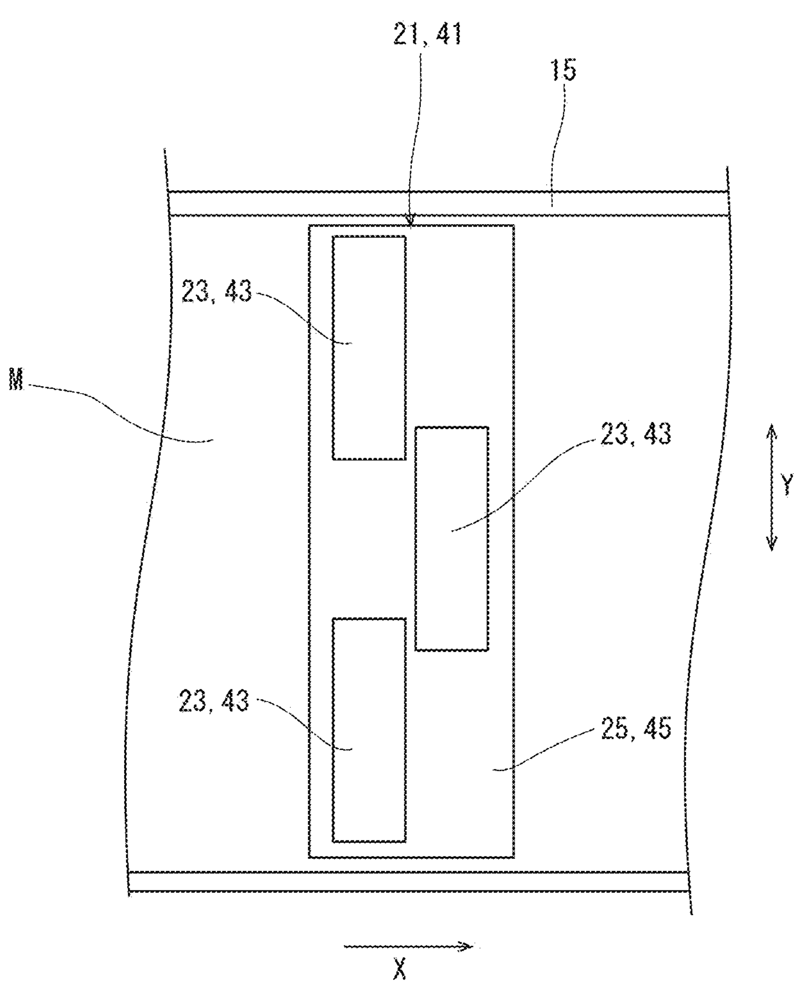
FIG. 2 is a plan view showing a head unit, in the inkjet image forming apparatus according to the embodiment of the present disclosure.

With reference to FIG. 2, the precoating head unit 21 will be described. FIG. 2 is a plan view showing the precoating head unit 21. The precoating head unit 21 is provided with three print heads 23 and a plate 25 for supporting the three print heads 23. The three print heads 23 are disposed in a staggered pattern along the width direction Y (intersecting the conveyance direction X) so as to have a length approximately equal to the width of the printing base material M (line head system), and are supported by the plate 25. A precoating liquid is supplied from a precoating liquid supply source to the three print heads 23.

The print head 23 includes a large number of nozzles and piezoelectric element provided in each nozzle. The ejection port of the nozzle is opened on the lower surface of the print head 23. The piezoelectric element is deformed by applying a voltage to the piezoelectric element, and the precoating liquid in the nozzle is ejected downward through the ejection port.

The components of the precoating liquid are, for example, 10% polyester resin (Trade name, PESRESIN A-640, manufactured by TAKAMATSU OIL&HAT CO., LTD.), 0.04% surfactant (Trade name, Surfynol 440, manufactured by Nisshin Chemical co., ltd.), 25% propylene glycol, and 64.96% water. Among them, the surfactant (dispersant) contains a component having an acetylene bond having a property of absorbing UV light.

Next, the photographing part 7 will be described with reference to FIG. 1. The photographing part 7 includes a light shielding box 31 having an open lower surface, and a UV lighting device 33 and a camera 35 arranged in the light shielding box 31. The light shielding box 31 is arranged such that the open lower surface faces the printing base material M passed through the precoating unit 5.

The UV lighting device 33 irradiates the printing base material M passing through the precoating unit 5 with UV light in the light shielding box 31. The camera 35 photographs the printing base material M irradiated by the UV lighting device 33. The camera 35 is electrically connected to the control part 61.

Next, the image forming part 9 will be described. The image forming part 9 forms an image on the printing base material M by an inkjet method. The image forming part 9 includes four image forming head units 41B, 41C, 41M, and 41Y (collectively referred to as the image forming head unit 41) corresponding to the inks of four colors (black, cyan, magenta, and yellow). The four image forming head units 41 are arranged in order along the conveyance direction X. The four image forming head units 41 are electrically connected to the control part 61.

The image forming head unit 41 has the same configuration as the precoating head unit 21 of the precoating unit 5 shown in FIG. 2, and includes the three print heads 43 and the plate 45 for supporting the three print heads 43. The black, cyan, magenta, and yellow inks are supplied to the three print heads 43 of the four image forming head units 41, respectively.

The print head 43 includes a large number of nozzles and piezoelectric elements provided in each nozzle. The ejection port of the nozzle is opened on the lower surface of the print head 43. The piezoelectric element is deformed by applying a voltage to the piezoelectric element, and the ink in the nozzle is ejected downward from the ejection port.

Next, the drying part 11 will be described with reference to FIG. 1. The drying part 11 dries the image formed on the printing base material M in the image forming part 9. The drying part 11 includes a heat drum 51, and upstream-side and downstream-side tension rollers 53 and 55 arranged on the upstream side and the downstream side of the heat drum 51. The printing base material M passing through the image forming part 9 is wound around the heat drum 51 between the upstream-side and downstream-side tension rollers 53 and 55. The heat drum 51 is heated to heat the printing base material M conveyed along the surface.

Next, the rewinding roller 13 will be described. The end of the printing base material M is fixed to the rewinding roller 13. The rewinding roller 13 is connected to a motor (not shown) and is rotated. By rotating the rewinding roller 13 in a predetermined direction at a predetermined rotational speed by the motor, the printing base material M is fed out from the feed roller 3. The fed printing base material M passes through the precoating unit 5, the photographing part 7, the image forming part 9, and the drying part 11, and is wound around the rewinding roller 13.

Next, the conveying plate 15 will be described. As shown in FIG. 1, the conveying plate 15 is disposed below the precoating unit 5, the photographing part 7, and the image forming part 9. The upper surface of the conveying plate 15 is formed flat. As shown in FIG. 2, a width of the conveying plate 15 is larger than a width of the printing base material M and all the head units 21 and 41. A heat source (not shown) is provided below the conveying plate 15 to heat the conveying plate 15 to a predetermined temperature. The conveying plate 15 is made of metal, for example.

On the upper surface of the conveying plate 15, a fluorescent coating material is applied to an area facing the photographing part 7. The surface applied with the fluorescent coating material (the fluorescent coating material coated surface) is defined as a fluorescent surface 15*a*.

Next, the control part 61 will be described. As shown in FIG. 1, the control part 61 controls the precoating head unit 21 of the precoating unit 5 and the four image forming head units 41 of the image forming part 9. To the control part 61, image data of an image photographed by the camera 35 of the photographing part 7 printed is input.

Figure 3:
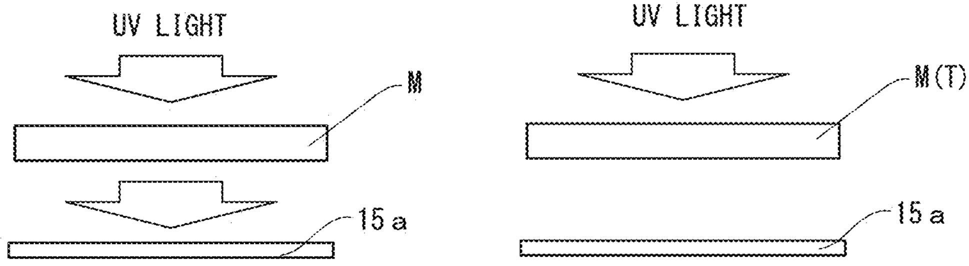
FIG. 3 is a view explaining an operation of a photographing part, in the inkjet image forming apparatus according to the embodiment of the present disclosure.
Figure 3:
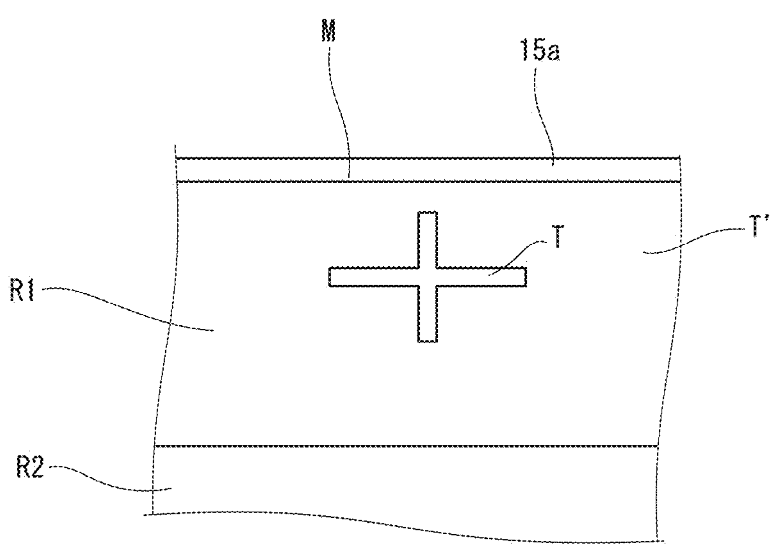

An image forming operation of the inkjet image forming apparatus 1 having the above configuration will be described with reference to FIG. 3. FIG. 3 is a view explaining the operation of the photographing part 7.

During the image forming operation, the motor is driven to rotate the rewinding roller 13, and the printing base material M is fed out from the feed roller 3. When the printing base material M is conveyed below the precoating unit 5, the control part 61 controls the precoating unit 5 to form a position adjustment mark T at a predetermined position outside an image forming region R1 of the printing base material M using the precoating liquid, as shown in the lower view of FIG. 3. The precoating unit 5 performs a precoating for ejecting the precoating liquid to an image forming region R2 as usual.

When the printing base material M is conveyed and the formed position adjustment mark T is conveyed below the photographing part 7, the position adjustment mark T is irradiated with UV light by the UV lighting device 33. When the position adjustment mark T is irradiated with visible light, since the printing base material M and the precoating liquid are transparent, only the fluorescent surface 15*a* of the conveying plate 15 is visible, and the position adjustment mark T cannot be distinguished from other area.

However, when the position adjustment mark T is irradiated with UV light, as shown in the lower view of FIG. 3, the area T' (the printing base material M) other than the position adjustment mark T transmits UV light. Then, as shown in the upper left view of FIG. 3, the transmitted UV light irradiates the fluorescent surface 15*a* of the conveying plate 15, and the fluorescent surface 15*a* fluoresces. On the other hand, as shown in the upper right view of FIG. 3, since the position adjustment mark T is formed of the precoating liquid having a property of absorbing UV light, the UV light is absorbed. Therefore, the fluorescent surface 15*a* below the position adjustment mark T is not irradiated with UV light and does not fluoresce. As a result, as shown in the lower view of FIG. 3, the position adjustment mark T becomes darker than the other area T' and is visualized. Since the UV lighting device 33 is surrounded by the light shielding box 31, external light is shielded and the position adjustment mark T is more clearly visible.

The visualized position adjustment mark T is photographed by the camera 35. The photographed position adjustment mark T is outputted to the control part 61. The control part 61 adjusts a printing position of an image to be formed, based on the mark T. The image forming part 9 ejects the ink of the predetermined color from the print head 43 of the image forming head unit 41 based on the image data to the adjusted printing position, and then an image is formed on the printing base material M. The printing base material M on which the image is formed is conveyed to the drying part 11. In the drying part 11, the ink is completely dried. Thereafter, the printing base material M is rewound by the rewinding roller 13.

As described above, according to the present disclosure, the printing position of the image by the image forming head unit 41 of the image forming part 9 is adjusted based on the position adjustment mark T formed by the precoating unit 5 (registration). When the printing base material M is made of material having a certain degree of stretchability, such as a plastic film, there is a case where the printing base material M is stretched by being pulled when it is conveyed by both rollers 3 and 13. Therefore, for example, when the position adjustment mark is previously written on the printing base material M, the position of the position adjustment mark may be shifted.

However, in the present embodiment, the position adjustment mark T is formed by the precoating immediately before the image forming operation. Therefore, the position adjustment mark T and the image are formed on the printing base material M under the same condition (stretched state). Therefore, the position adjustment accuracy is improved, and an excellent image without the color mixing of the inks and the like can be formed.

Figure 4A:
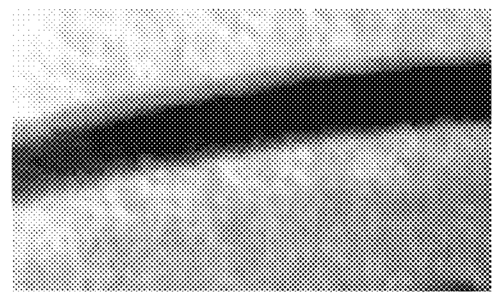
FIG. 4A shows an image in the present example, in the inkjet image forming apparatus according to the embodiment of the present disclosure.
Figure 4B:
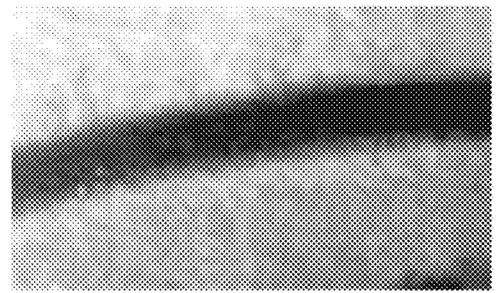
FIG. 4B shows an image in the comparative example, in the inkjet image forming apparatus according to the embodiment of the present disclosure.

With reference to FIG. 4A and FIG. 4B, the effects of the present disclosure will be described. A test image in which images of four different colors are adjacent is printed at 600 dpi. FIG. 4A shows a test image of the present example in which the position adjustment of the present embodiment is performed, and FIG. 5B shows a test image of a comparative example in which the normal position adjustment is performed.

As shown in FIG. 4A, in the present example, the boundaries of the images of different colors are distinct. On the other hand, as shown in FIG. 4B, in the comparative example, it can be seen that the boundaries of the images of different colors are blurred and mixed.

In this embodiment, since the printing base material M is conveyed along the upper surface of the conveying plate 15, there is a possibility that the fluorescent surface 15*a* comes into contact with the printing base material M and peels off. For this reason, it is preferable that the printing base material M is conveyed while being slightly lifted from the upper surface of the conveying plate 15.

In the above embodiment, the image forming head unit 41 of the four colors is used, but the present disclosure is not limited to the four colors and may be more or less than four colors. The head units 21 and 41 are not limited to the line head system. However, the line head system is preferable because the printing speed can be increased. Although a long plastic film (PET film) is used as the printing base material M, a cut film may be used.

Although the present disclosure has been described in particular embodiments, the present disclosure is not limited to the foregoing embodiments. A person skilled in the art may modify the above embodiments so long as they do not deviate from the scope and object of the present disclosure.

The invention claimed is:

1. An inkjet image forming apparatus comprising:

an image forming part which ejects ink on a printing base material conveyed in a predetermined conveyance direction to form an image;

a precoating unit which is arranged on an upstream side of the image forming part in the conveyance direction, and ejects a precoating liquid having a property of absorbing UV light;

a fluorescent coating surface which is arranged between the image forming part and the precoating unit, and on which the printing base material is conveyed; and a UV lighting device which irradiates the printing base material conveyed on the fluorescent coating surface with UV light;

a camera which photographs the printing base material irradiated with the UV light, wherein a position adjustment mark is formed on the printing base material by using the precoating liquid in the precoating unit, the formed position adjustment mark is irradiated with the UV light by the UV lighting device, the irradiated position adjustment mark is photographed by the camera, and the image forming part forms an image based on the photographed position adjustment mark.

2. The inkjet image forming apparatus according to claim 1, wherein the precoating liquid contains a dispersant, and the dispersant has a property of absorbing UV light.

3. The inkjet image forming apparatus according to claim 1, wherein the image forming part includes a head unit which ejects the ink, the precoating unit includes a head unit which ejects the precoating liquid, and both the head units have the same structure.

4. The inkjet image forming apparatus according to claim 1, wherein the printing base materials is a plastic film.

* * * * *